United States Patent

[11] 3,618,699

[72] Inventors Robert C. Evans;
William R. Morgan, both of Cincinnati, Ohio
[21] Appl. No. 32,197
[22] Filed Apr. 27, 1970
[45] Patented Nov. 9, 1971
[73] Assignee General Electric Company

[54] MULTIPLE PURE TONE NOISE SUPPRESSION DEVICE FOR AN AIRCRAFT GAS TURBINE ENGINE
6 Claims, 6 Drawing Figs.

[52] U.S. Cl. .................................... 181/33 HA, 181/33 HD, 137/15.1
[51] Int. Cl. .................................... F02k 1/26, B64d 33/02, F01n 1/08
[50] Field of Search .......................... 181/33, 33.21, 33.222, 35.1, 35; 137/15.1, 15.2; 415/119

[56] References Cited
UNITED STATES PATENTS
2,763,426  9/1956  Erwin .................... 181/33 (.21)
2,948,111  8/1960  Nelson ................... 137/15.1
2,966,028  12/1960  Johnson et al. .......... 137/15.1
3,484,847  12/1969  Poole .................... 181/33 (.222)
3,494,380  2/1970   Martin ................... 137/15.1
3,532,100  10/1970  Ward et al. ............. 137/15.1

FOREIGN PATENTS
1,510,897  12/1967  France ................... 181/33 (.222)

Primary Examiner—Robert S. Ward, Jr.
Attorneys—Derek P. Lawrence, Thomas J. Bird, Jr., Lee H. Sachs, Frank L. Neuhauser, Oscar B. Waddell and Joseph B. Forman ABSTRACT: Sound suppression means for a gas turbine power plant which includes a fan positioned within a bypass duct surrounding a core engine which drives said fan. An inflatable diaphragm is positioned within an inlet opening of said bypass duct along the inner wall of the casing which surrounds the fan. Means are provided for selectively inflating said diaphragm such that inlet flow along said inner wall can be increased to sonic or near sonic velocity thereby effectively preventing propagation of multiple pure tone noise generated by said fan from said bypass duct.

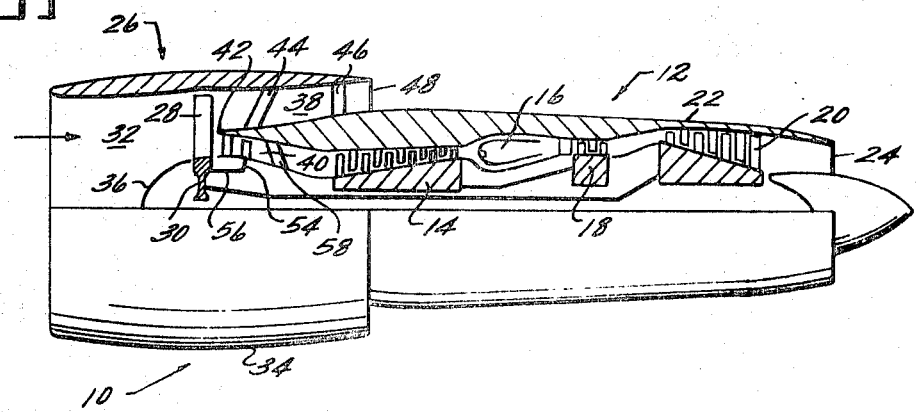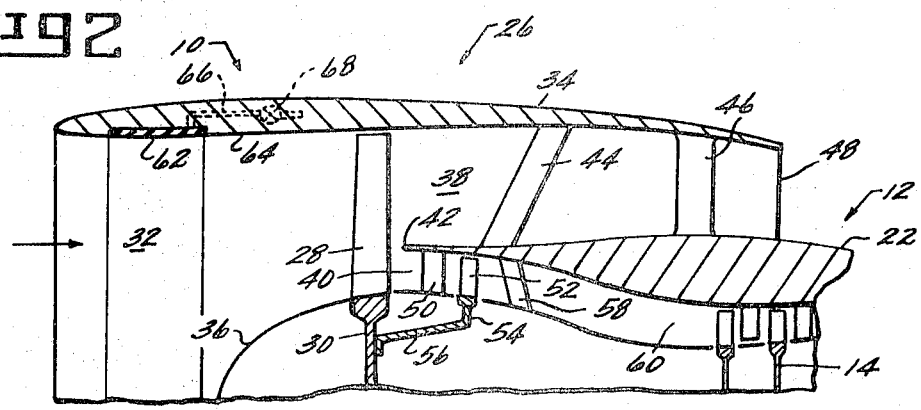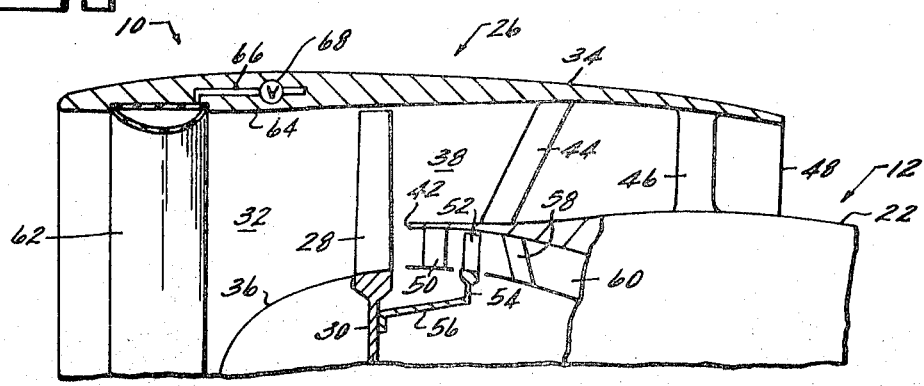

INVENTORS.
ROBERT C. EVANS
WILLIAM R. MORGAN

BY

T. J. Bird, Jr.
AGENT

MULTIPLE PURE TONE NOISE SUPPRESSION DEVICE FOR AN AIRCRAFT GAS TURBINE ENGINE

BACKGROUND OF THE INVENTION

This invention relates generally to gas turbine engine noise suppression devices and, more particularly, to such a device for eliminating multiple pure tone noise generated by a high tip speed turbofan engine.

In recent years, the noise levels generated by gas turbine engine powered aircraft have created noise problems for both the general public and the aviation industry as well as for engine manufacturers. With the general growth in the aviation industry has come the generation of noise level standards which must be met by aircraft and gas turbine engine manufacturers before an aircraft powered by a gas turbine engine will be certified by the Federal Aviation Agency. This general growth in the aviation industry, however, has also resulted in a demand for newer and larger and more powerful gas turbine engines. This demand has resulted in the birth of a new family of high bypass, large diameter turbofan engines capable of producing thrust levels of greater than 40,000 pounds. While experimentation has shown that the noise levels generated by this new family of turbofan engines are lower than those of previous generation engines, a vast amount of effort is still being expended in an attempt to further reduce the noise levels associated with such engines.

In the air intake duct of a gas turbine engine, objectionable sounds travel in the direction opposite that of the airflow and out of the intake duct. These sounds originate within the engine and are transmitted through the incoming air. If the velocity of the incoming air in the duct is increased to equal or exceed the velocity of sound at all incoming air conditions across a plane perpendicular to the inlet ducts center line at any one place along the length of the duct, this condition (known as choked flow) operates as a sound barrier through which undesirable sound waves cannot pass. Such a phenomenon has been shown to be quite effective with regular gas turbine engines.

An apparatus for providing such a choked flow condition has been shown and claimed in an application of John T. Kutney, Ser. No. 1,223, entitled "Choked Inlet Noise Suppression Device for a Turbofan Engine," and assigned to the same assignee as the present application. As shown in the Kutney application, an inflatable diaphragm is positioned around the interior wall of a duct surrounding a turbofan engine. This inflatable diaphragm provides completely choked flow to a passageway between the duct and a contoured surface of a splitter platform which extends from a stationary inlet guide vanes and divides the fan duct into inner and outer passageways. Such a device has been shown to effectively restrict the transmission of all sound generated within the outer passageway of the fan duct.

Recent developments in the gas turbine manufacturing art have shown that for some applications the stationary inlet guide vanes shown in the Kutney application are unnecessary for successful engine operation. In such applications, the inlet guide vanes merely add unnecessary weight and increase the cost of the engine. A Kutney-type noise suppressor which chokes the entire inlet flow would have to work on the total inlet flow area of an IGV-less engine and would require large physical changes in the flow path contour. Because of the associated performance losses with the flow path changes, a Kutney-type suppressor may be impractical for such an engine. In contrast to the Kutney device, the subject device is designed primarily to reduce multiple pure tone (MPT) noise which is a characteristic of all high bypass ratio turbofan engines operating at and above fan rotor sonic tip relative Mach numbers, particularly IGV-less front fan engines.

There are two current theories on the generation and propagation of MPT noise, which is primarily pure tone noise measured in the engine far field, audible, and at high enough levels to be annoying to the human ear if sufficient sound suppression is not applied. The first theory may be generally designated the shock wave theory. As the fan wheel speed increases, a point is reached (in the region of tip relative Mach number equal to one) where shock waves start to form at the fan blade tips. These shock waves are transmitted upstream along the inlet duct wall at frequencies which are per revolution multiples of the wheel speed, i.e., N×r.p.m./60 where N is an integer 1, 2, 3, etc. These frequencies are normally less than the blade passing fundamental frequency. Further wheel speed increases cause the rotor shock field to move radially inwardly with the result being that MPT tones of varying level and frequency appear to be excited and transmitted.

The second theory is normally designated the pressure field theory. Associated with each fan blade is a pressure field. The transmission of the pressure pulses as pure tones produces the multiple per revolution pulses in the far field, i.e., N×r.p.m./60. Data recorded and reduced from transducers mounted close to the rotor of a high bypass fan clearly shows the existence of these pulses at all fan speeds, i.e., both below and above the fan speed at which the MPT's are measured in the far field, above a relative Mach number of one. At low fan speeds, these pressure pulses decay rapidly and do not reach the far field. At a certain fan speed a so-called "cutoff" point is reached at which theoretically the MPT pressure pulses propagate upstream and radiate from the inlet. The "cutoff" point for a front fan rotor engine occurs at a tip relative Mach number slightly greater than one (this coincidentally is also the speed at which the shock waves start to form). The pressure pulses, therefore, would start to propagate above the "cutoff" fan speed. It is generally felt that the majority of the MPT tone energy, generated under either theory above, transmits upstream in a region near the inlet duct wall. Noise suppression panels positioned within the inlet duct wall can provide sound suppression over a broad frequency range, but for the most part are ineffective at lower frequencies (0 to 1,000 Hz.) where MPT's show maximum level.

SUMMARY OF THE INVENTION

It is an object of the present invention, therefore, to provide a noise suppressor for a front fan type gas turbine engine, which suppressor is especially effective at relatively low frequencies.

It is a further object of this invention to provide such a noise suppressor for eliminating multiple pure tone noise generated by such an engine.

Briefly stated, the objects of this invention are carried out by providing the inlet duct wall of a turbofan engine with either an inflatable surface which is capable of selective inflation or with mechanically actuated surface panels which are capable of increasing the velocity of the inlet flow near the inlet wall to sonic or near sonic conditions.

DESCRIPTION OF THE DRAWINGS

While the specification concludes with claims particularly pointing out and distinctly claiming the subject matter of the invention which is sought to be protected, an understanding of the invention may be gained from the following detailed description of a preferred embodiment in connection with the accompanying drawings, in which:

FIG. 1 is a generally schematic sectional view of a high bypass, IGV-less turbofan engine;

FIG. 2 is an enlarged, sectional view of a portion of the inlet of the turbofan engine shown in FIG. 1;

FIG. 3 is an enlarged sectional view similar to FIG. 2 showing a noise suppression device constructed in accordance with this invention in its operating position;

DESCRIPTION OF A PREFERRED EMBODIMENT

Figure 4:
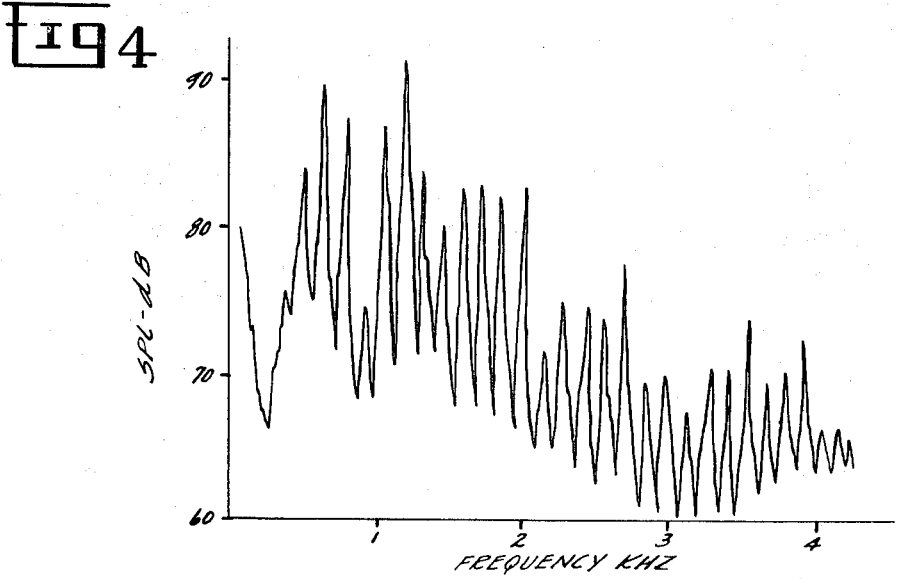
FIG. 4 is a graphical plot of far field noise generated by a typical turbofan engine.

Referring now to the drawings wherein like numerals correspond to like elements throughout, FIG. 1 shows in simplified fashion a gas turbine engine 10 of the high bypass front fan type comprising a core engine 12, which is essentially a turboshaft engine in that it includes a compressor 14, a combustor 16, a gas generator turbine 18 for driving the compressor 14, and a power turbine 20 arranged in axially spaced serial flow relationship. The inner turbomachine, or core engine 12, is enclosed within a cylindrical casing 22 which terminates at its downstream end in an exhaust nozzle 24 through which the combustion products of the core engine 12 may be discharged to produce thrust. To provide additional thrust, a fan 26 is mounted upstream of the core engine 12 and is driven by the power turbine 20. The fan 26 is comprised of a plurality of fan blades 28 which extends radially from a fan wheel 30, which is coupled for rotation to the power turbine 20. The fan blades 28 extend radially across a bypass duct or passageway 32 defined between an outer cylindrical casing 34 and a "bullet nose" 36 located upstream of the fan blades 28. Downstream of the fan blades 28, the passageway 32 is split into two passages 38 and 40 by a splitter platform 42. Radially positioned between the casing 34 and the splitter platform 42 are a plurality of fan stator vanes 44, which are followed by a plurality of fan outlet guide vanes 46. Thus, a portion of the airflow entering the passageway 32 flows through the fan blades 28, into the passageway 38, through the stator vanes 44 and through the outlet guide vanes 46 and thereafter exists through an outlet opening 48 formed by the casing 34 and the splitter platform 42. Since this air is pressurized in flowing through the fan blades 28, it provides forward thrust to the turbofan engine 10.

The remainder of the air flowing through the passageway 32 and the fan blades 28 enters the passageway 40. Located within this passageway 40 are a plurality of inlet guide vanes 50 for the core engine 12, which are followed by a plurality of rotatable compressor blades 52, which extend from a compressor disc 54 and are coupled for rotation with the fan blades 28 by means of the disc 54 and a shaft 56. Located downstream of the compressor blade 52 is a row of stator vanes 58. Air passing through the stator vanes 58 next flows into the core engine 12 through the passageway 60.

The gas turbine engine 10 is a high bypass ratio machine; by the term "high bypass ratio" it is meant that the ratio of the mass flow of fluid in the bypass passageway 38 to the mass flow in the core engine 12 (or passageway 40) is high. Since a substantial amount of energy is extracted from the combustion gases in driving the power turbine 20 (except for losses, this energy is transferred to the bypass stream as the air in the passageway 32 is accelerated by the fan blades 28), it will occur to those skilled in the art that the major portion of the total thrust provided by the gas turbine engine 10 is generated by the bypass stream of air emanating from the outlet 48.

One characteristic of every high bypass ratio engine is that the diameter of the bypass fan is much larger than the diameter normally associated with a compressor or turbine section of the core engine. Because of this large diameter, the rotation of the fan 26 may result in unacceptable noise levels unless some provision is made for reducing the intensity of noise generated by such a fan. The present invention relates to such a device for reducing the noise level associated with rotation of the large diameter fan and, more particularly, relates to reducing multiple pure tone noise generated by such a fan.

Referring now to FIGS. 2 and 3, the details of applicant's noise reduction device are shown in an enlarged sectional view of the inlet of the turbofan engine 10. As shown therein, the outer casing 34 is provided near its upstream end with an elastic diaphragm 62, which preferably surrounds the entire casing 34 on an inner wall 64 thereof. (While, for simplicity, reference hereinafter will be continually made to the elastic diaphragm 62, it should be apparent to those skilled in the art that mechanically operated panels could replace the diaphragm and applicants' invention would operate in the same manner. The elastic diaphragm 62 extends peripherally about the inner wall 64 of the casing 34 and is secured thereto at its upstream and downstream ends in a fluidically sealed manner. A conduit 66 is provided within the casing 34 for supplying pressurized fluid from a source (not shown) of pressurized air to the underside of the diaphragm 62. The conduit 66 is provided with suitable control means such as a valve 68 for regulating the flow of pressurized fluid to the underside of the elastic diaphragm 62.

In its deflated position, as illustrated in FIG. 2, the diaphragm is contiguous with the wall 64 so as not to interfere with the flow of air through the passageway 32. When pressurized fluid is allowed to pass to the underside of the diaphragm 62 in order to inflate the same to the position shown in FIG. 3, the diaphragm 62 extends into the passageway 32 an insignificant amount as far as the total flow area of the passageway 32 is concerned, but sufficiently far enough to increase the local velocity of airflow along the wall 64 as will presently be discussed.

As previously mentioned, multiple pure tone noise is generated by rotation of the fan blades 28 either due to the transmission of the pressure pulses generated by each rotating blade 28 or due to the transmission of shock waves generated near the tips of the rotating blades 28. In either case, the majority of the pure tone noise is transmitted upstream along the inlet duct wall 64.

Referring to FIG. 4, a 50 Hz. narrow band spectrum of noise data is shown as recorded in the far field. As discussed above, MPT(pure tone) noise generated during certain portions of operation of the untreated gas turbine engine 10 emanates from the inlet duct of the engine. Such MPT noise shows up as a series of peaks, labeled MPT's, on FIG. 4.

Figure 5:
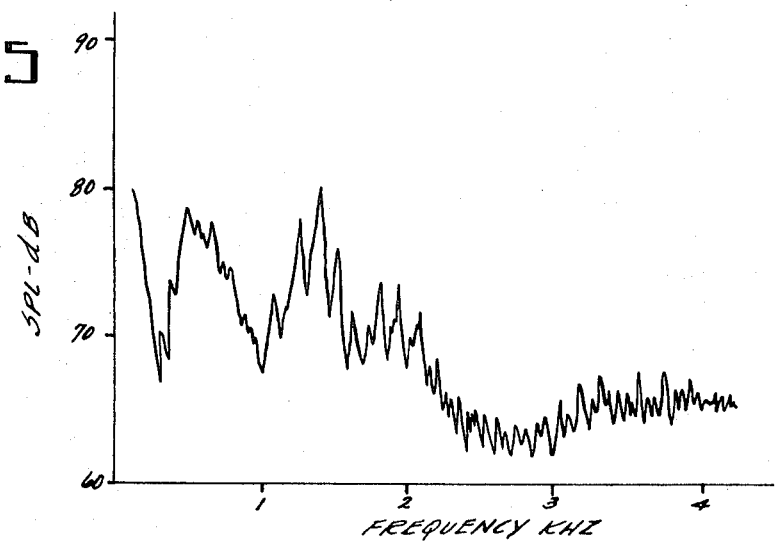
FIG. 5 is a plot, similar to FIG. 4, showing the effects of inlet wall sonic flow on MPT noise.

Actuation of the inflatable diaphragm 62 by opening the valve 68 causes the air at the inlet throat flowing near the inlet wall 64 to increase in velocity to sonic or near sonic conditions. Since sound cannot "swim" upstream against sonic flow, the multiple pure tone noise is impeded and prevented from emanating from the inlet duct. The result of actuation of the diaphragm 62 to the point where flow along the wall 64 is between $M=0.95$ and 1.0 is plotted in FIG. 5. As can be seen, the number and intensity of the peaks has been drastically reduced.

As previously mentioned, a Kutney application, assigned to the same assignee as the present invention, teaches the positioning of a similar inflatable diaphragm within an inlet duct of a turbofan engine. The Kutney inflatable diaphragm, however, cooperates with a platform member to provide a nozzle which effectively chokes the entire outer passageway of the turbofan engine shown in the Kutney application. The inflatable diaphragm 62 is not utilized to choke the flow within the inlet duct. That is, the inflatable diaphragm 62 expands only a sufficient amount to increase the local velocity of flow along the inner wall 64 to sonic or near sonic flow. In this manner, the small overall change in inlet geometry of the turbofan engine 10 will not affect the performance of the fan 26 in any significant manner. The relatively small physical expansion of the inflatable diaphragm 62 is sufficient, however, to prevent propagation of multiple pure tone noise energy from the inlet duct. In this manner, possible annoyance to people located within hearing of the turbofan engine is reduced.

While the inflatable diaphragm 62 would be capable of inflation during any portion of the flight schedule, preferably inflation thereof will take place only during takeoff conditions of an aircraft powered by the gas turbine engine 10. It is only during take off conditions that multiple pure tone noise constitutes a noise problem, as at higher altitudes multiple pure tone noise has sufficiently subsided prior to reaching ground level as to not constitute a noise problem and at lower approach fan speeds multiple pure tone noise is not generated.

Figure 6:
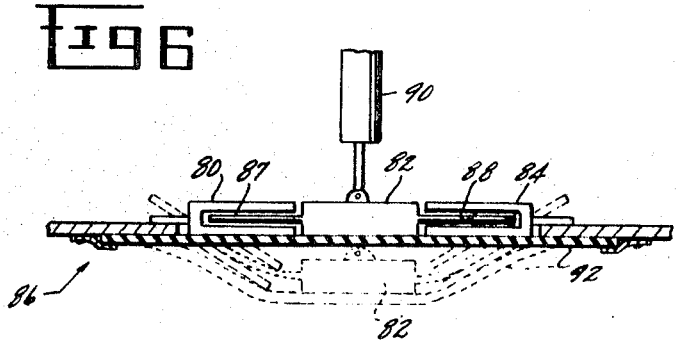
FIG. 6 is a partial sectional view of an alternative embodiment.

As shown in FIG. 6, the inflatable diaphragm 62 could be replaced by a series of mechanically actuated panels 80–84, which are capable of movement between the position shown in solid lines in FIG. 6 where they present a smooth inner wall 86, and the position shown in dotted lines in FIG. 6 where they provide a sufficient change in inlet geometry to increase the velocity of flow near the inner wall 86 to near sonic velocity. The center panel 82 would be constructed of a plurality of pieces positioned around the periphery and would include arms 87 to fit within grooves 88 provided in each of the panels 80 and 84. The members making up the center panel 82 would also have to be provided with sufficient spacing therebetween to allow for actuation. An actuator 90 is provided for each of the panels 82 to selectively move them to the dotted line position shown in FIG. 6. If desirable, the panels 80-84 could be covered with a flexible cover or skin 92 to provide a smooth flow surface.

While preferred embodiments of the present invention have been depicted and described above, it will be appreciated by those skilled in the art that many modifications, substitutions, and changes may be made thereto without departing from the invention's fundamental scheme. It is intended, therefore, that the appended claims cover such modifications.

We claim:

1. In a jet propulsion power plant of the turbofan type having a core engine and a fan driven by the core engine, sound suppression means comprising:
   a cylindrical casing enclosing the fan of said power plant and spaced from said core engine to form therewith an axially extending bypass passageway for the passage of motive fluid between inlet and outlet openings at opposite ends of said casing,
   expandable means carried by said casing adjacent said inlet opening, said expandable means having a first position wherein it is contiguous with an inner wall of said casing and second position wherein it extends into said bypass passageway, and
   means for selectively moving said expandable means between said first and second positions, said second position adapted to increase the velocity of flow near said inner wall to sonic or near sonic velocity whereby multiple pure tone noise generated by said fan is prevented from propagating forwardly through said inlet opening.

2. Sound suppression means as recited in claim 1 further characterized in that said expandable means comprises a circumferential elastic diaphragm and means are provided for inflating said diaphragm, said inflating means comprising piping positioned within said casing and lying in fluidic flow cooperation with a source of pressurized fluid.

3. Sound suppression means as recited in claim 2 wherein said source of pressurized fluid comprises said core engine.

4. Sound suppression means as recited in claim 3 further characterized in that inflation of said diaphragm affects the velocity of only that portion of the motive fluid flowing near said inner wall of said casing.

5. Sound suppression means as recited in claim 1 further characterized in that said expandable means comprises a plurality of mechanically actuated panels.

6. Sound suppression means as recited in claim 5 wherein said panels are covered by a flexible skin which is connected to said inner wall.

* * * * *